UNITED STATES PATENT OFFICE.

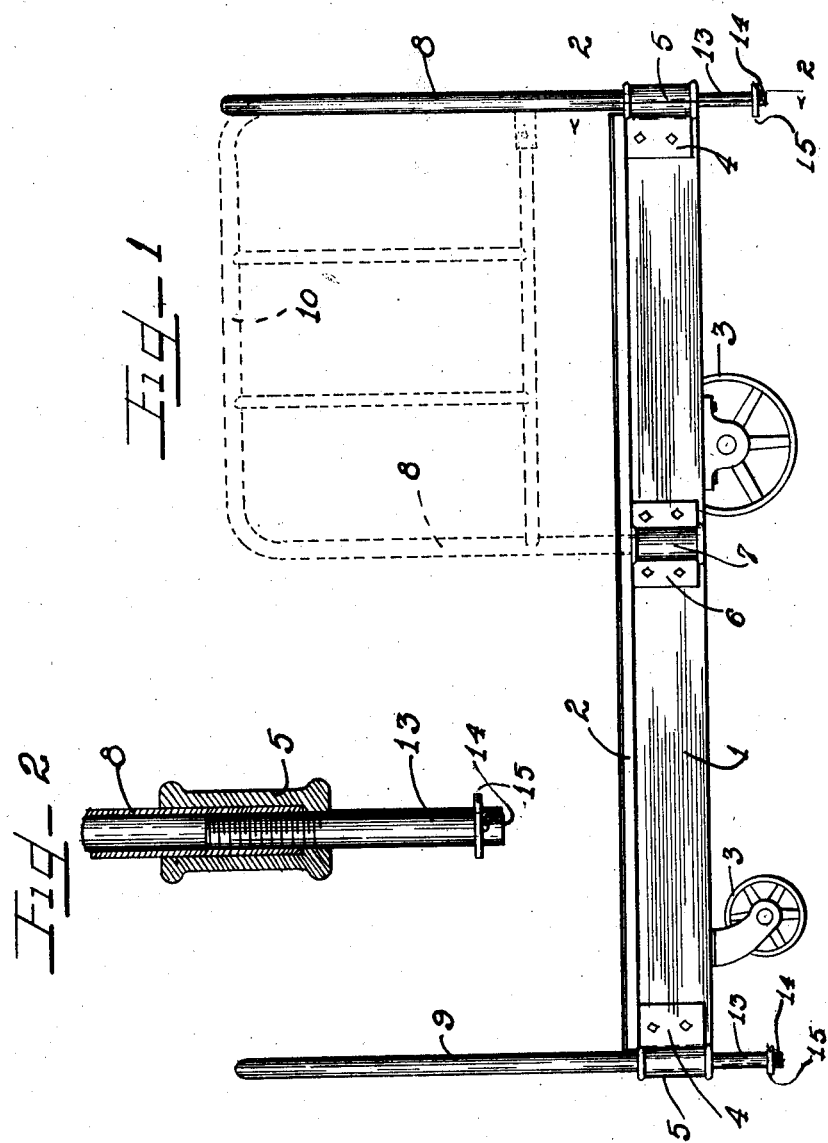

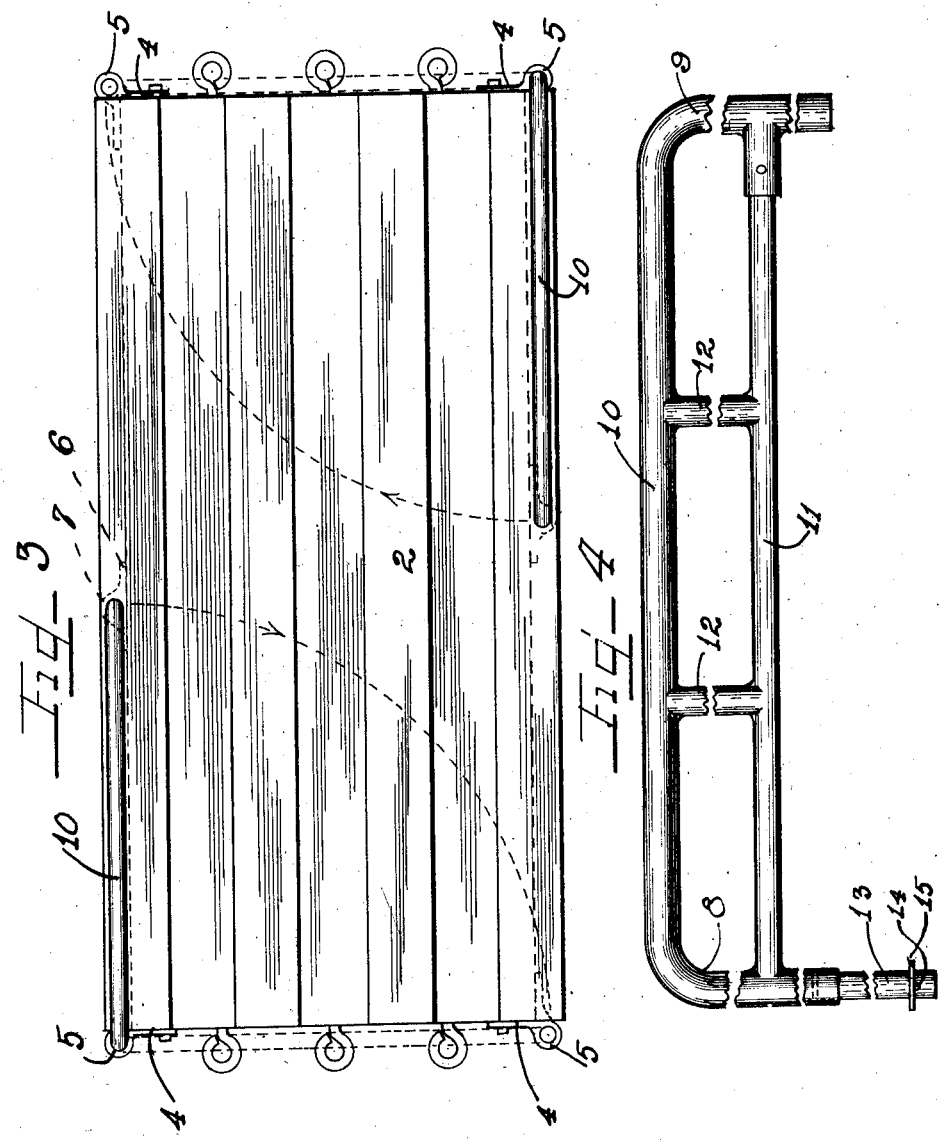

GUILFORD S. WOOD, OF CHICAGO, ILLINOIS.

TRUCK.

1,345,469.  Specification of Letters Patent.  Patented July 6, 1920.

Application filed June 29, 1917. Serial No. 177,668.

*To all whom it may concern:*

Be it known that I, GUILFORD S. WOOD, a citizen of the United States, and a resident of the city of Chicago, in the county of Cook and State of Illinois, have invented certain new and useful Improvements in Trucks; and I do hereby declare that the following is a full, clear, and exact description of the same, reference being had to the accompanying drawings, and to the numerals of reference marked thereon, which form a part of this specification.

This invention relates to a hand truck having end and side rails capable of being swung either into position on the ends of the truck, or on the sides thereof.

It is an object therefore of this invention to construct a truck having pivoted rails for use either on the sides or ends of a truck, and capable of being swung into either position of adjustment.

It is also an object of this invention to construct a truck having pivoted rails for use either on the sides or ends of a truck, consisting of tubular members welded one to another to afford a unitary construction, and with a pivot and receiving socket connection for each rail of the truck to permit adjustment thereof into position on either the end or the side of the truck, as desired.

It is also an object of this invention to construct combination swinging side and end truck rails comprising tubular elements welded one to another embracing top and bottom transverse members with upright members secured therebetween and with a slip connection between one of the side upright members and a socket member on the truck to permit elevation and pivotal movement of said rails in either direction without removal from the truck to facilitate loading and unloading of the truck, and with mechanism acting to hold said rails in either of the fixed positions to which they are adjusted.

Other and further important objects of the invention will be apparent from the disclosure in the drawings and specifications.

The invention (in a preferred form) is illustrated in the drawings and hereinafter more fully described.

On the drawings:

Figure 1 is a side elevation of a truck equipped with pivoted side and end rails according to the principles of my invention.

Fig. 2 is a sectional detail on line 2—2 of Fig. 1.

Fig. 3 is a top plan view of the truck.

Fig. 4 is a fragmentary enlarged elevation of one of the rail members for the truck.

As shown on the drawings:

The frame of the truck is denoted as a whole by the reference numeral 1, and is provided with a flat deck or floor 2, and with wheels 3, journaled in suitable brackets thereon to permit the truck to be rolled from place to place. Secured upon each end of the truck frame are corner brackets 4, each supporting a tubular socket 5. Brackets 6, are also secured upon the side sills of the frame, and each affords a socket 7. The combination end and side rails of the truck consist of a tubular bar bent to form side legs or uprights 8 and 9, respectively, joined together by an upper transversely extending top rail member 10. A lower transverse tubular member 11, is brazed or otherwise secured between the uprights 8 and 9, and extending between the lower transverse member 11, and the upper transverse member 10, are intermediate uprights 12. Threaded into the lower tubular end of the upright member 8, of each of said rail members, or otherwise secured therein, is a rod or shaft 13, which is adapted to extend through and beyond the lower end of one of the socket members 5, as shown in Fig. 2. A pin 14, is engaged releasably through the lower end of said rod or shaft, and engaged on the rod above the pin, is a washer 15, said rod and washer acting to prevent disengagement of the upright member 8, from its socket, although permitting elevation thereof for rotational adjustment of the rail member.

The rail members may be engaged in the end socket 5, thus standing in upright position at each end of the truck, as shown in Fig. 1, or they may be swung into position whereby the upright 9, is engaged with one of the side bracket sockets 7, with the rail members disposed upon the sides of the truck, as shown in Fig. 3. The rod extension 13, on the upright member 8, of each of the rail members, permits the rail member to be elevated prior to a rotational adjustment thereof after which the rail member is lowered so that the respective lower ends of the uprights 8 and 9, engage into the sockets in the brackets provided therefor, either upon the ends, or end and side of the truck frame.

I am aware that various details of this invention may be varied through a wide range without departing from the principles thereof, and I therefore do not purpose limiting the patent granted otherwise than necessitated by the prior art.

I claim as my invention:

1. The combination with a truck having apertured sockets at the corners and sides thereof, of a gate comprising rail members pivoted in the corner sockets, transverse members connecting the rail members, a shaft extension in one rail member at each end of the truck, said shaft extending through the apertured socket and movable therein whereby the opposite end of the gate may be lifted and swung to engage another socket on the truck frame, and means removably secured to the shaft adapted to prevent the shaft from being lifted out of the socket.

2. In a truck of the class described a socket, an apertured internal flange in the lower end of the socket, a tubular member rotatable in the socket and seated on the flange, a gate secured to the tubular member, and a shaft threaded in the tubular member and extending through the aperture whereby the tubular member may be lifted and rotated without being disengaged from the socket.

3. The combination with a truck, of socket members and rail members releasably connected therewith, a shaft extension on one side of each of said rail members extending below its socket member permitting said rail member to be elevated without disengagement from said socket to swing the disengaged end of the rail member into engagement with another socket upon the truck frame.

4. The combination with a truck, of rail members adjustably mounted thereon adapted to be elevated and swung from a transverse to a longitudinal position on the truck without removal therefrom.

In testimony whereof I have hereunto subscribed my name in the presence of two subscribing witnesses.

GUILFORD S. WOOD.

Witnesses:
CHARLES W. HILLS, Jr.,
EARL M. HARDINE.